United States Patent
Lepage et al.

(10) Patent No.: US 7,754,018 B2
(45) Date of Patent: Jul. 13, 2010

(54) METHOD AND APPARATUS FOR CLEANING A MOBILE IMMERSED STRUCTURE

(75) Inventors: Yann Georges Lepage, Marseilles (FR); Laurent Jean Dollon, Paris (FR)

(73) Assignee: CGGveritas Services SA, Massy (FR)

( * ) Notice: Subject to any disclaimer, the term of this patent is extended or adjusted under 35 U.S.C. 154(b) by 1419 days.

(21) Appl. No.: 10/536,851

(22) PCT Filed: Nov. 28, 2003

(86) PCT No.: PCT/FR03/03529

§ 371 (c)(1),
(2), (4) Date: May 27, 2005

(87) PCT Pub. No.: WO2004/051316

PCT Pub. Date: Jun. 17, 2004

(65) Prior Publication Data

US 2006/0054186 A1    Mar. 16, 2006

(30) Foreign Application Priority Data

Nov. 28, 2002  (FR) .................................. 02 14933

(51) Int. Cl.
*B08B 7/00*  (2006.01)
*B63B 21/56* (2006.01)

(52) U.S. Cl. .......................................... 134/6; 114/253
(58) Field of Classification Search ................ 114/242, 114/243, 244, 245, 253, 312, 322; 15/246, 15/256.6; 367/15, 191; 134/6, 64 R, 122 R, 134/199

See application file for complete search history.

(56) References Cited

U.S. PATENT DOCUMENTS

| 4,267,585 | A | * | 5/1981 | Georgallis | ................... | 367/13 |
| 4,290,123 | A | * | 9/1981 | Pickens | ....................... | 367/13 |
| 5,238,331 | A |   | 8/1993 | Chapman |   |   |
| 5,351,359 | A | * | 10/1994 | Golden | ...................... | 15/256.6 |

FOREIGN PATENT DOCUMENTS

| GB | 2 027 473 |   | 2/1980 |
| JP | 6-165336 | * | 6/1994 |

* cited by examiner

*Primary Examiner*—Michael Kornakov
*Assistant Examiner*—Stephen Ko
(74) *Attorney, Agent, or Firm*—Fulbright & Jaworski, L.L.P.

(57) ABSTRACT

The invention concerns a cleaning process for an immersed and towed seismic streamer (1), characterised in that a cleaning appliance (11), including a tool for cleaning the seismic streamer, is engaged around the seismic streamer, together with a hydrodynamic drag structure which results in the free movement of the cleaning appliance along the length of the seismic streamer (1).

10 Claims, 7 Drawing Sheets

METHOD AND APPARATUS FOR CLEANING A MOBILE IMMERSED STRUCTURE

FIELD OF THE INVENTION

Background

This present invention relates to a process and a cleaning appliance for a mobile immersed structure (or floating if appropriate).

Seismic arrays or "streamers" are used in particular to explore underwater ground structures, in particular to look for the presence of oil or of gas in the sedimentary layers of the ocean floor.

Such a streamer generally includes a hollow tubular structure, along the length of which are provided hydrophones (sensors which are sensitive to underwater acoustic waves), as well as vanes ("or planes") which are used to adjust the depth of immersion of the section of streamer to which they are attached. The hydrophones are used to measure the propagation times of echoes of sound pulses which are returned by the sedimentary layers.

Streamers can have a length of several kilometres or even tens of kilometres. They can remain immersed in the seawater for several consecutive months. They are generally immersed to a shallow depth (of a few metres), and towed along at low speed (not more than 5. knots). The tubular structure of the streamer is therefore subject to fouling. Living organisms that develop on the outer surface of this structure can lead to the formation on the latter of amalgams or incrustations which interfere with the measurements to be performed.

It is therefore necessary to clean the outer surface of the tubular structure of the streamer. This cleaning necessitates cessation of the measurements and "rewinding" of the streamer on board the ship that is towing it. This results in a considerable wastage of time.

One objective of the invention is to offer a process and a cleaning appliance for such a structure, which provides at least a partial remedy for these drawbacks.

SUMMARY

According to a first aspect, the invention consists of cleaning a seismic streamer while it is being towed by a ship, by means of a cleaning appliance consisting of a tool for cleaning the outer surface of the streamer, and a structure which creates a hydrodynamic drag by free displacement of the cleaning appliance along the length of the streamer.

It is preferable that one should generate movement of the cleaning appliance along the length of the streamer at a speed of at least 0.5. metres per second, and in particular at a speed located within a range of 1. to 2.5. m/s. To this end, the streamer is towed at a higher speed in order that the cleaning appliance moves at an adequate speed in relation to the water. The ratio of the towing speed of the streamer to the sliding speed of the cleaning appliance along the length of the streamer is of the order of 1.5. m/s for example, with the speed of the cleaning appliance in relation to the water being of the order of 1. m/s for example.

According to another aspect, the invention proposes a cleaning appliance for the cleaning of a seismic streamer—or a similar rope-like immersed structure—which includes:
   a tool for cleaning the outer surface of the streamer,
   the means of positioning and guidance, adapted to the shape of the streamer, in order to allow the cleaning appliance to remain attached to the streamer and to travel along the length of the latter, and
   a drag structure to create hydrodynamic resistance during movement of the cleaning appliance along the longitudinal axis of the streamer (and/or along the axis of the positioning and guidance devices), so as to give rise to a movement of the cleaning appliance along the streamer when the latter is moved (towed under the water) along its longitudinal axis.

Because of the presence of the drag structure, it is possible to cause the cleaning appliance to slide along the length of the immersed streamer when it is towed, without requiring the provision of, or a reserve of, external drive energy. The cleaning appliance moves independently by sliding along the length of the tubular structure of the streamer. No "umbilical" connecting the appliance to the ship is therefore necessary.

It is preferable that the resources for positioning and guidance of the appliance in relation to the streamer should include a pair—and preferably several pairs—of wheels, rollers, runners, or pulleys, to roll or slide at low friction, respectively on two approximately diametrically-opposite portions of the outer surface of the tubular structure of the streamer.

It is preferable that the appliance should also include—and this is yet another aspect of the invention—some buoyancy resources in order to allow the cleaning appliance to maintain an approximately constant tilt, and therefore an approximately constant orientation (to within plus or minus 5 or 10 degrees, for example) in relation to the longitudinal axis of the streamer, during its movement along the length of the towed streamer. This allows the appliance to be astride the vanes— "wings" or "planes" or other protruding accessories—which are attached to the tubular structure of the streamer, during the movement of the cleaning appliance along the length of the streamer.

According to another aspect of the invention, a cleaning appliance for a seismic streamer according to the invention includes a mobile cleaning tool, in particular a rotary cleaning brush, as well as the drive resources to move the tool (in particular to cause the brush to rotate), under the effect of movement of the cleaning appliance in relation to the water which surrounds it and/or in relation to the streamer. In this latter case, these drive resources are preferably moved by friction on the outer surface of the rope-like (tubular) structure of the streamer.

Implementation of the drag structure can take various forms. The different elements making up the appliance, which project in relation to the outer surface of the streamer, can in certain cases contribute to the creation of a structure presenting a level of drag which is sufficient, firstly, to oppose the mechanical friction forces due to the cleaning appliance sliding along the length of the streamer and, secondly, to provide it with an adequate speed of movement along the length of the latter. However, in order to limit the size of the appliance and also the acoustic noise resulting from of the movement of the appliance, it is preferably equipped with a specially-designed structure in order to increase the hydrodynamic drag of the cleaning appliance.

According to a preferred method of implementation, this structure includes a section of conduit which broadens out at the front and is open at its two ends. This results in a structure in the form of a throat or funnel or water sock, through which the surrounding seawater flows because of the movement of the appliance in relation to the latter.

When such a drag structure is used, the drag results from the high drag coefficient of a cone placed in the direction opposite to the flow.

Alternatively or additionally, it is possible to equip the cleaning appliance with a flap or pivoting deflector capable of extending approximately crosswise in relation to the direction of movement of the cleaning appliance, in order to give rise to a additional drag in an automatic manner.

It is preferable to equip the cleaning appliance with a drag structure consisting of two drag structure elements, which are approximately identical (or symmetrical) in shape and dimensions and positioned approximately diametrically opposite to each other on the axis of movement of the appliance along the streamer, that is in relation to the longitudinal axis of the streamer. This enables one to orientate a resultant of the two drags contributed respectively by each drag structure element, approximately parallel to the axis of movement of the cleaning appliance along the streamer. This also allows the hydrodynamic forces exerted on the cleaning appliance and on the streamer to be balanced. The result is a reduction in the mechanical stresses exerted by the cleaning appliance on the streamer as well as greater effectiveness of the system for "passive propulsion" of the appliance along the streamer.

In order to adapt the cleaning appliance to various towing conditions of the streamer, and in particular in order to increase or reduce the speed of movement of the appliance along the streamer, the latter preferably includes the means to adjust the drag coefficient of the drag structure. To this end, part at least of the drag structure can be arranged to pivot or to move between a position of maximum drag and a position of minimum drag.

In order to reduce the forces exerted on the streamer and to facilitate the clearance, by the cleaning appliance, of projections presented along the length of the tubular body of the streamer, the positioning and/or guidance devices of the appliance on the streamer are preferably deployable and/or retractable. To this end, the appliance is preferably equipped with the means to force the positioning and/or guidance devices to a position pressing onto the outer surface of the streamer, while also allowing the positioning and/or guidance devices to move away from the outer surface to a position where obstacles are cleared. According to a preferred method of implementation, the appliance includes a suspension arm supporting the positioning and/or guidance devices (such as wheels or rollers), as well as a spring for the return of the suspension arm to a position where the positioning and/or guidance devices are pressing onto the outer surface of the streamer.

Other advantages and characteristics of the invention will be understood by reading the following description, which refers also to the appended drawings, illustrating the preferred methods of implementation of the invention, without any limiting character.

DETAILED DESCRIPTION

In this present application, the terms "front" and "rear" are employed with reference to an imaginary observer located behind the ship, in particular behind the streamer, and observing the stern of the ship that is towing the streamer.

Figure 1:
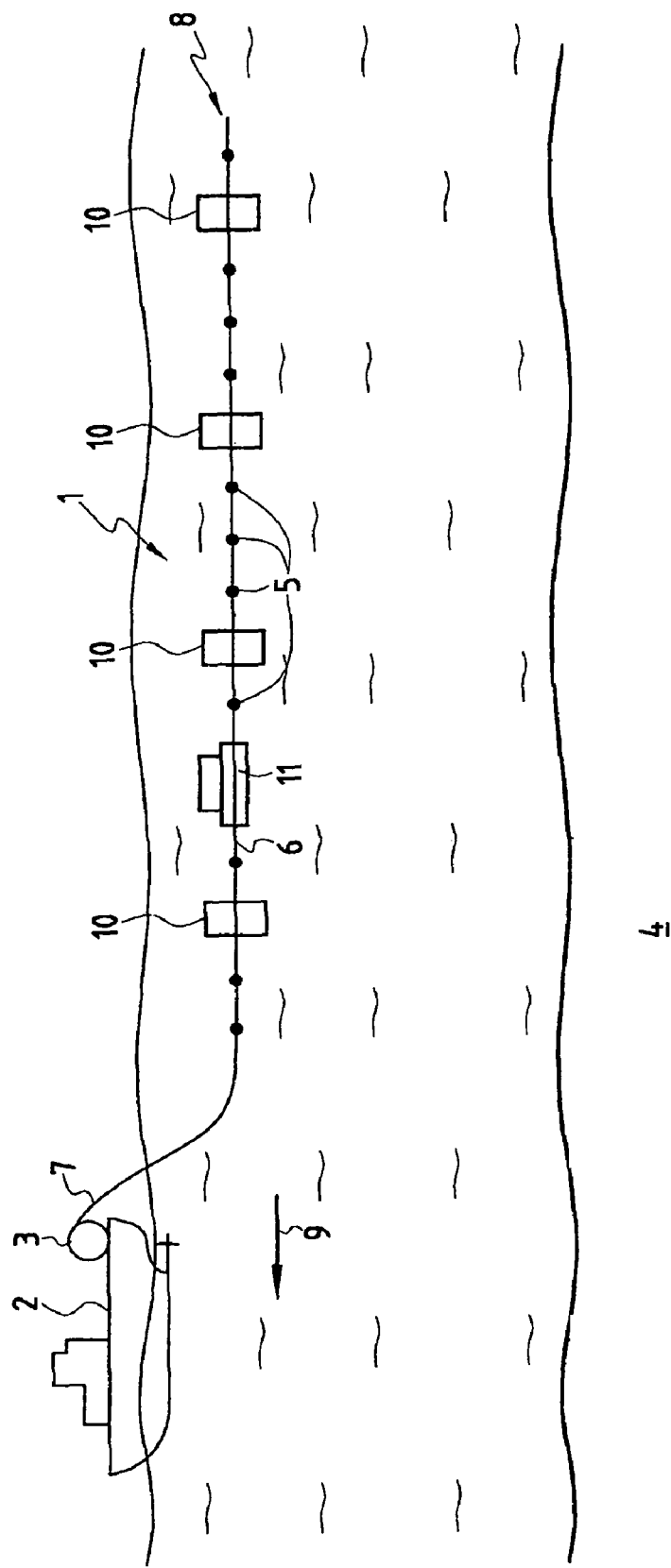
FIG. 1 is a schematic view illustrating the implementation of a cleaning appliance according to the invention for the cleaning of a seismic immersed streamer in the process of being towed.
Figure 2:
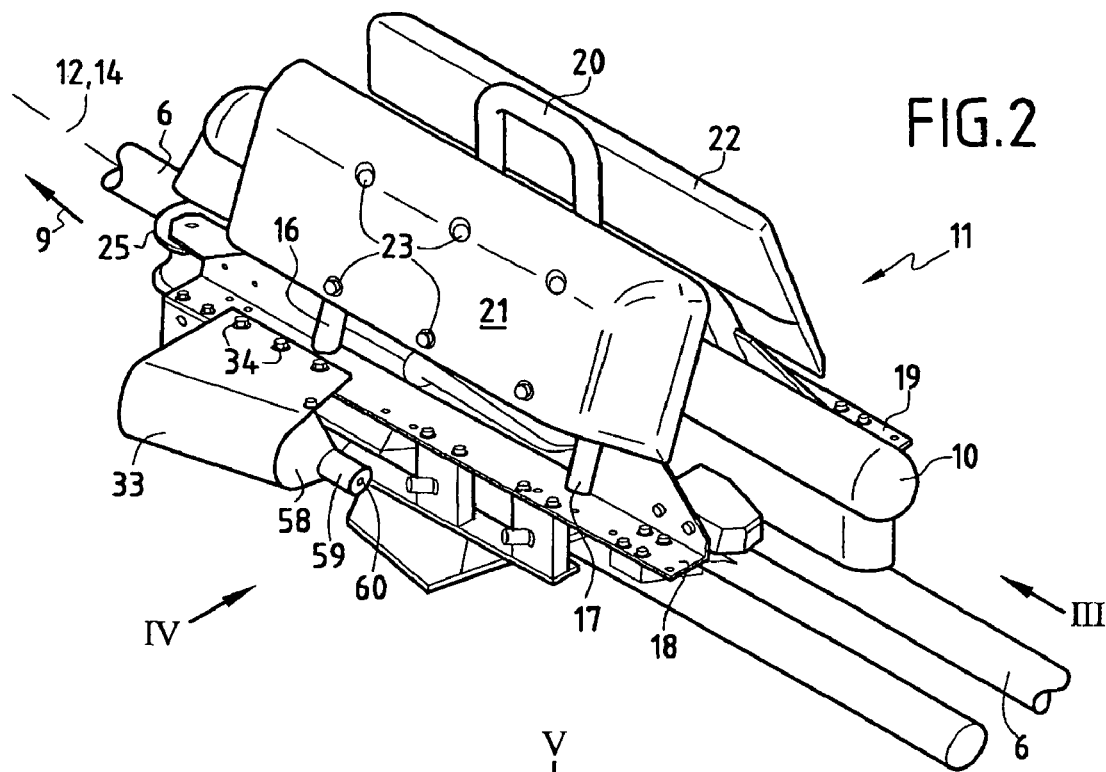
FIG. 2 is a rear view in perspective of a preferred method of implementation of a cleaning appliance according to the invention, engaged around a portion of seismic streamer.
Figure 3:
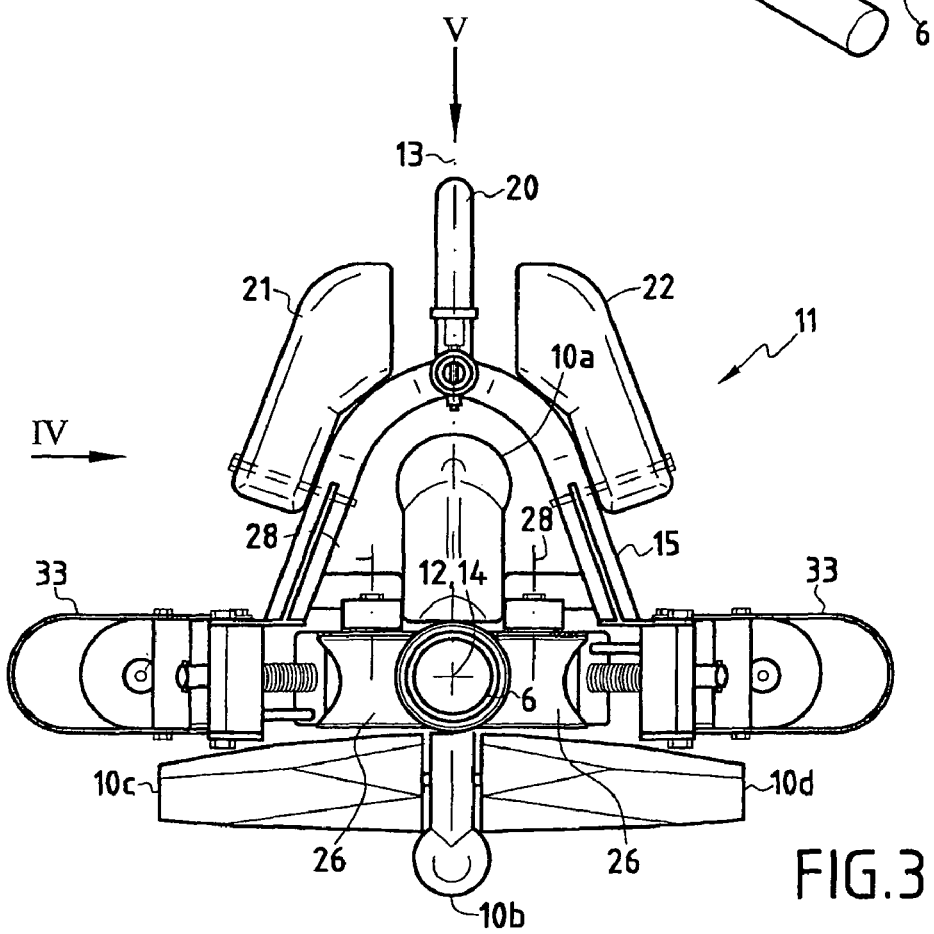
FIG. 3, which is a view along line III of FIG. 2, illustrates the same cleaning appliance as seen from the rear.
Figure 4:
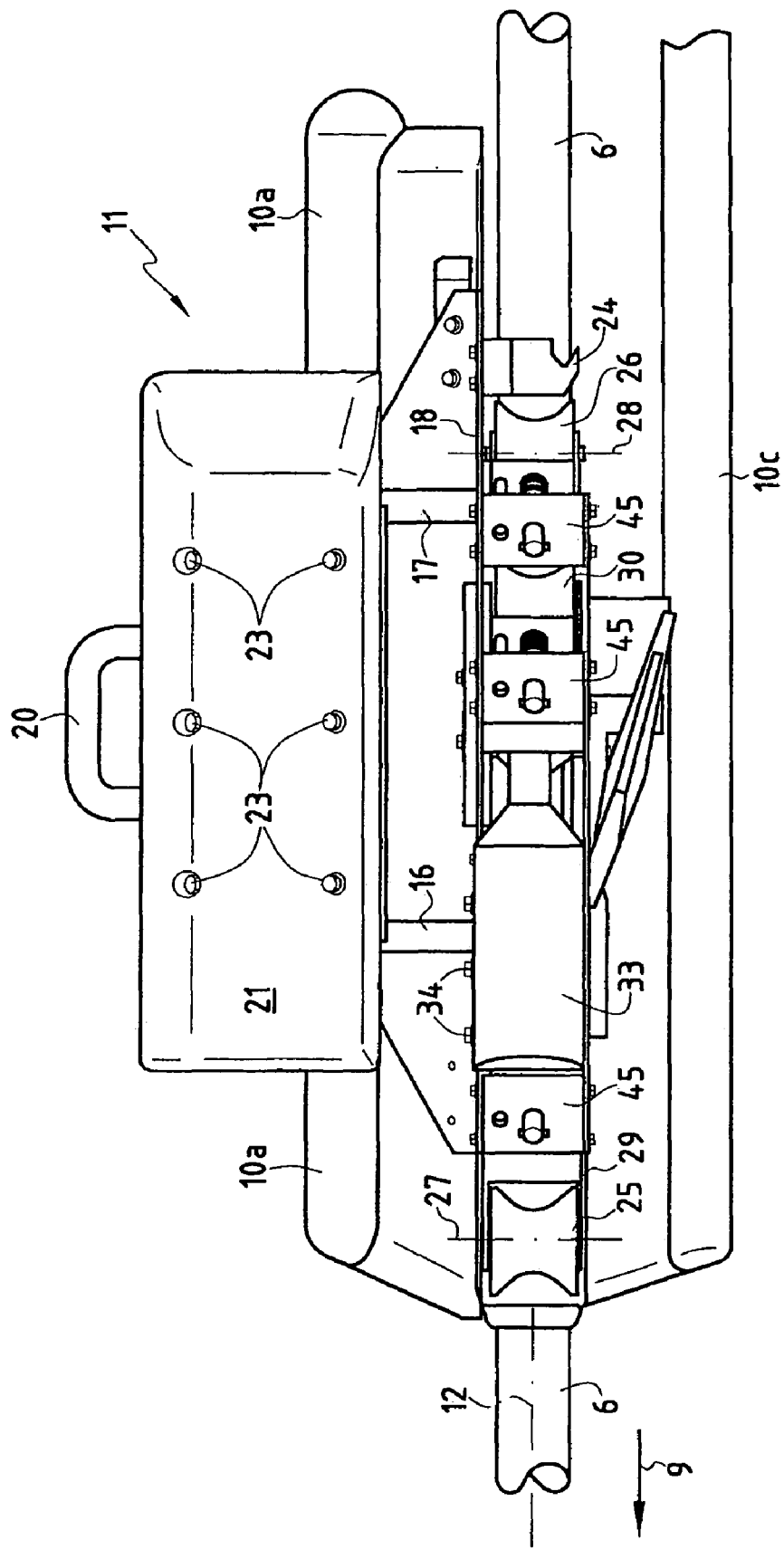
FIG. 4 illustrates the same cleaning appliance as seen from the side, and is a view along line IV of FIGS. 2 and 3.
Figure 5:
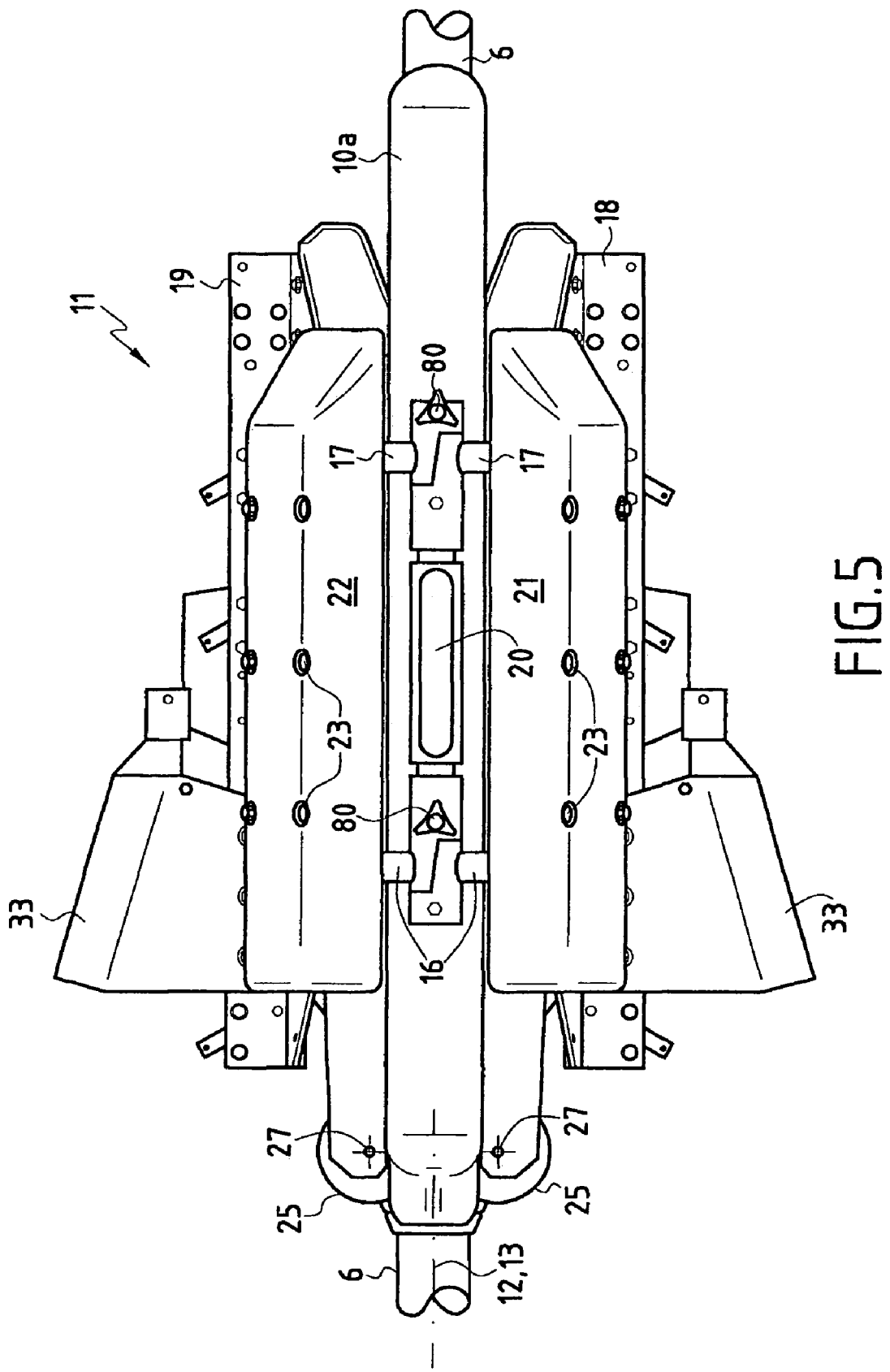
FIG. 5 is a plan view of the appliance, and a view along line V of FIG. 3.
Figure 6:
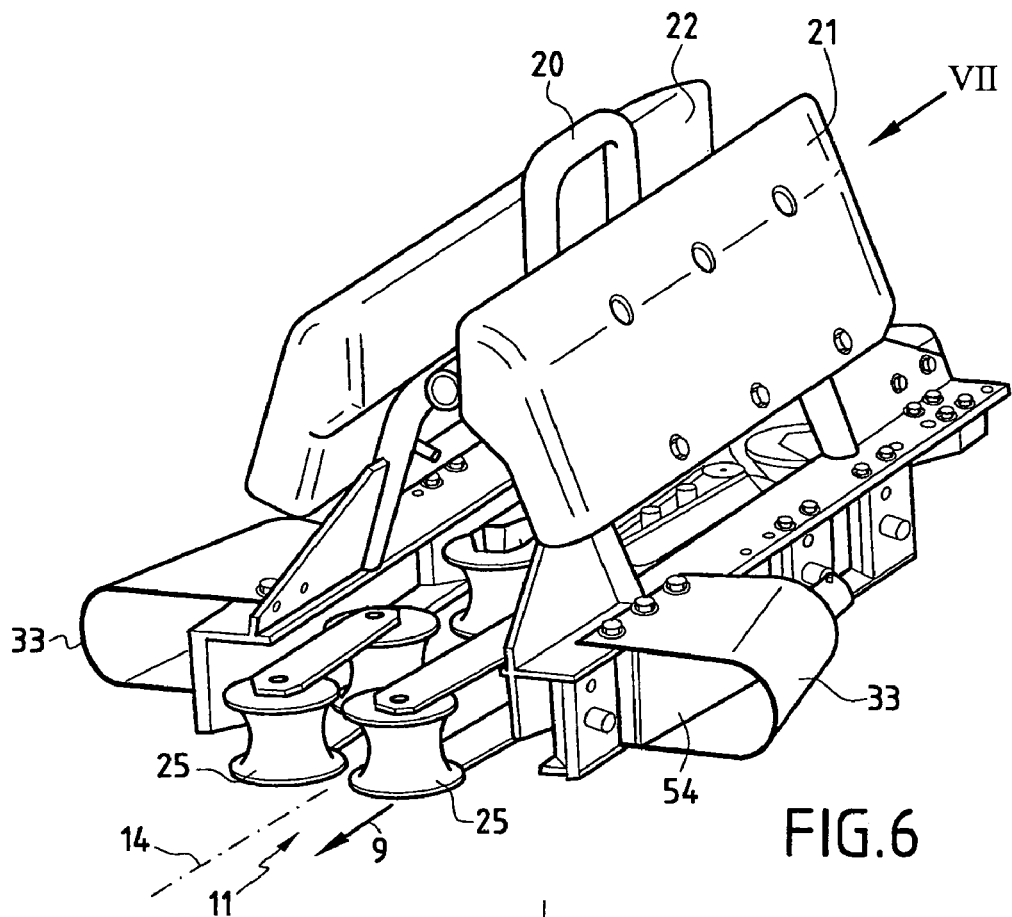
FIG. 6 is a front view, in perspective, of the appliance of FIGS. 1 to 5.

With reference to FIG. 1, a streamer 1 is towed by a ship 2 to which it is attached by means of the drum 3 of a winch fitted to the ship. The streamer is designed to be used to analyse the structure of the sea bottom 4 by means of the resources (not shown) for processing the signals delivered by the sensors on the streamer. To this end, it includes a multiplicity of hydrophones 5 attached to a flexible tube 6, a front end 7 of which is attached to the winch, and a rear end 8 which is free. The streamer is towed in the direction of the arrow 9 at a speed of approximately 5. knots. The streamer also includes buoyancy devices 10 attached to the tube 6 in order to hold the streamer at a uniform depth (over its length) and/or constant depth (over time).

As illustrated in particular in FIGS. 2 to 5, the appendages 10 on the streamer can include an upper part 10a. acting as a buoyancy device, a lower part 10b approximately diametrically opposite to the upper part 10a, and two lateral parts (vanes or planes) 10c. and 10d. extending from the lower part 10b.

Figure 7:
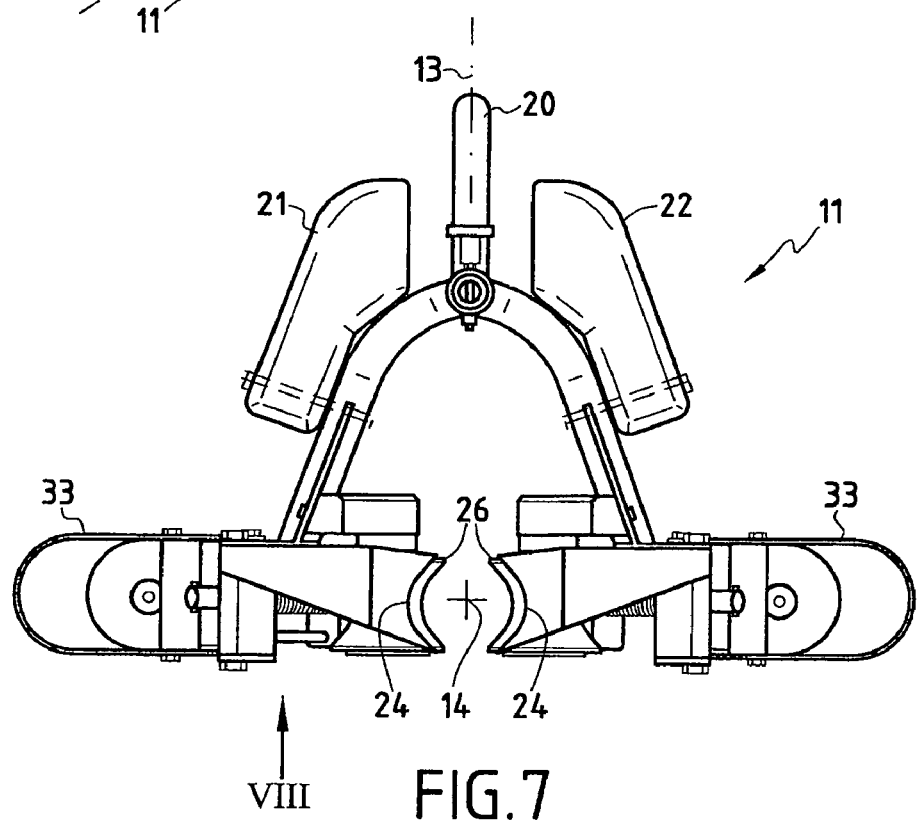
FIG. 7 is a rear view of the appliance.
Figure 8:
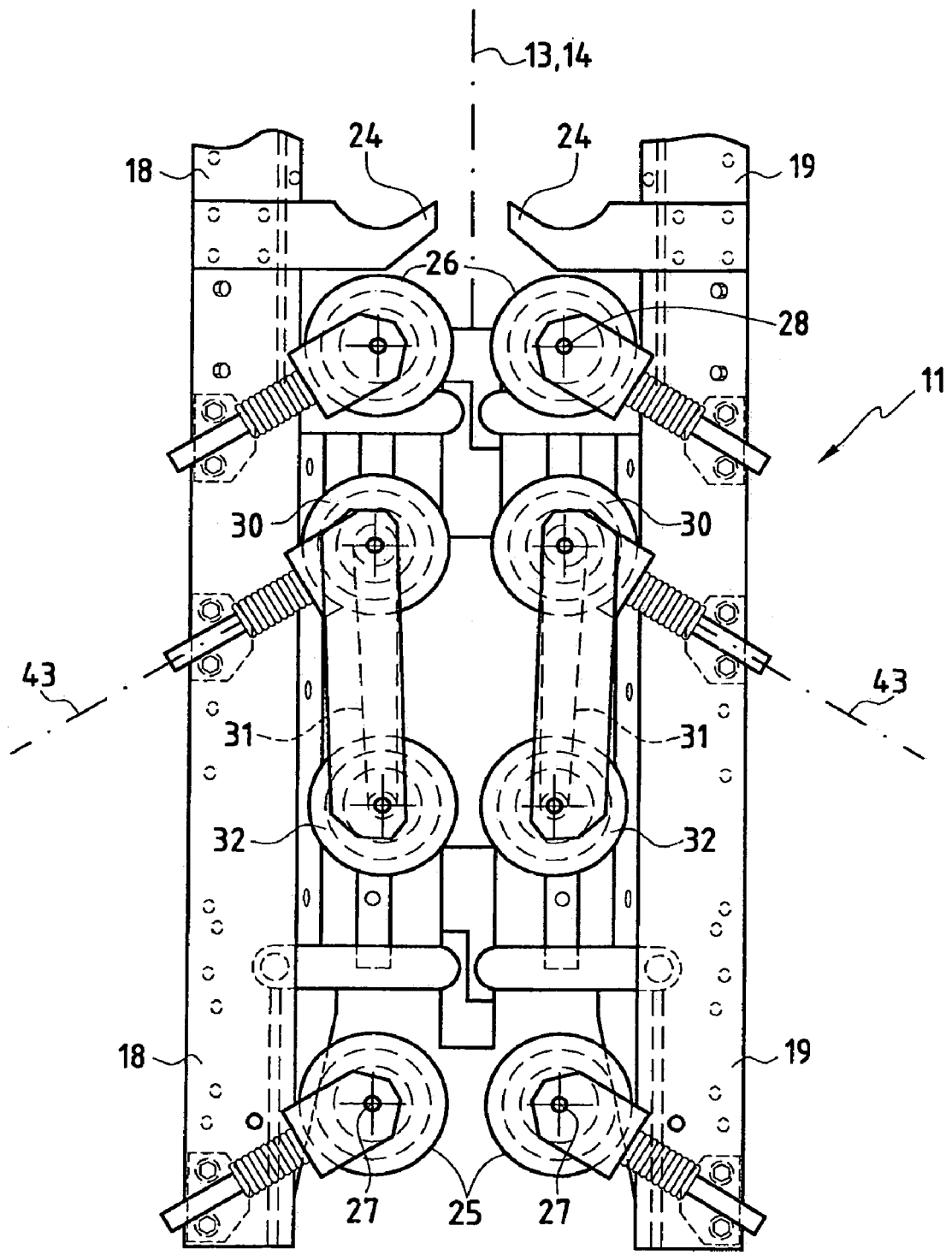
FIG. 8 is a bottom view of the appliance of FIGS. 1 to 7, and is a view along line VIII of FIG. 7. Unlike FIGS. 1 to 5, the streamer is not shown on FIGS. 6 to 8.

On these figures, the streamer cleaning device 11 is illustrated in a position in which it is astride the appendage 10 attached to the tubular body 6 of the streamer. The tubular body 6 extends along its longitudinal axis 12, the direction 9 of traction of the streamer being approximately parallel to axis 12. In the position where the cleaning appliance 11 is astride the streamer, the axis of symmetry 14 of the means for positioning and guidance of the appliance is approximately coincident with the longitudinal axis 12 of the tubular part 6 of the streamer. As illustrated in particular in FIGS. 3 and 7, the appliance 11 presents a general symmetry along a front-to-back plane 13 containing the axis of symmetry 14 of the positioning and guidance resources.

With reference to FIGS. 2 to 8, the cleaning appliance 11, forming a trolley running along the length of the streamer, includes:

a chassis 15 consisting of two transverse shackles 16 and 17 connecting two rails 18 and 19 extending parallel to axis 14, as well as an upper middle structure 20 designed to facilitate the lifting of the appliance 11;

two hollow longitudinal elements 21 and 22 attached to the upper part of the chassis 15 by bolts 23 positioned on the outside of the shackles 16 and 17 and used to provide the immersed cleaning appliance 11 with an apparent mass (or buoyancy potential) of approximately zero and an approximately constant tilt;

two blades 24 positioned at the rear end of the appliance 11 and intended to cut or knock off large incrustations formed on the outer surface of the tubular structure 6 of the streamer;

a pair of front guidance rollers 25, in the form of a diabolo, the profile of which is complementary to the cylindrical surface 6 of the streamer, and which are designed to rotate along two axes 27 parallel to the plane of symmetry 13 and perpendicular to axes 12 and 14, on arms 29 designed to pivot on rails 18 and 19;

two rear positioning and guidance rollers 26, identical or similar to the front guidance rollers 25, which are designed to pivot along two axes 28 parallel to plane 13 and to axes 27, on arms which pivot on rails 18 and 19;

two intermediate rollers 30, also positioned on either side of plane 13 and symmetrical in relation to the latter, which are held in contact with the structure 6 by arms fitted with the means of retraction, and attached to rails 18 and 19. These intermediate rollers 30 are employed to drive in rotation, by means of belts or transmission chains 31, two rotating brushes 32 also positioned symmetrically on either side of plane 13 and of the longitudinal axis 14 of the appliance;

two structures 33 used to increase the hydrodynamic resistance of the appliance, which are attached on either side of the latter, symmetrically in relation to plane 13 and to rails 18 and 19, by fixing bolts 34.

Figure 9:
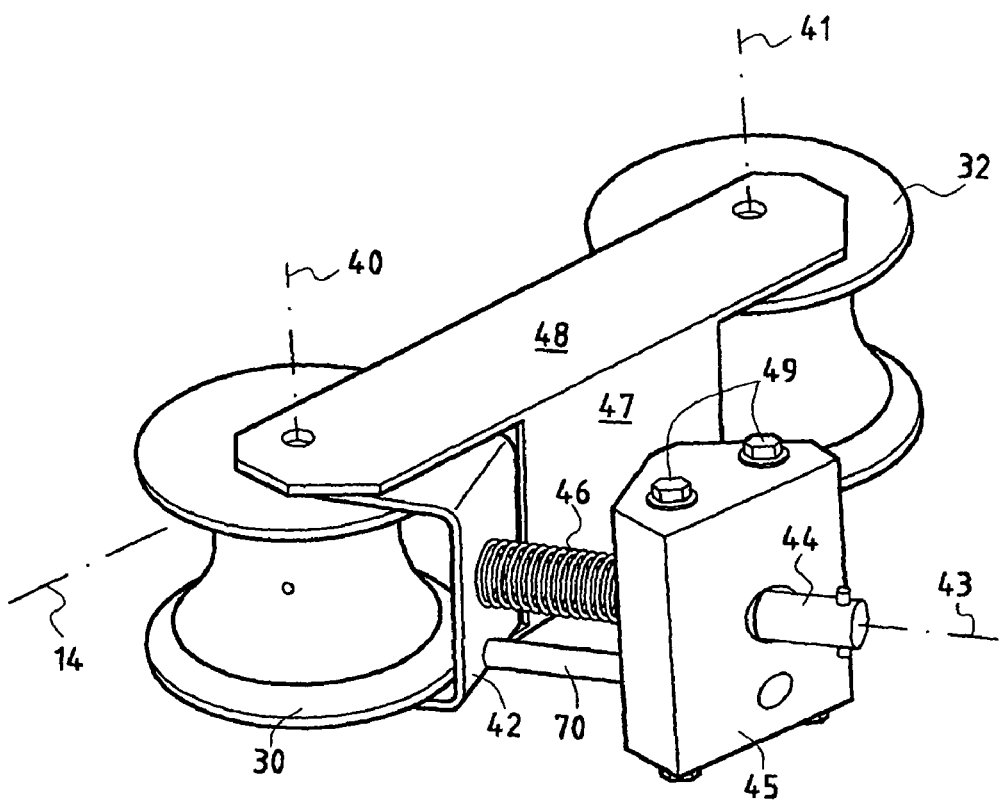
FIG. 9 illustrates, in perspective, a brushing module that can be driven by friction against the streamer, which equips the appliance of FIGS. 1 to 8.

With reference to FIG. 9, the device for rotation of the rotating brushes 32 along their axis of rotation 41 parallel to front-to-back plane 13 of the appliance, includes rollers 30 which are driven by friction against the outer surface of the tubular structure 6 of the streamer, in rotation along their axis 40 parallel to axis 41. The roller 30 pivots on its axis in relation to a yoke 42 which slides along an axis 43 in relation to a shaft 44, which is fixes to one of rails 18 and 19 of the appliance by means of an attachment element 45 and by means of bolts 49. The yoke 42, acting as a bearing to the friction roller 30, is held against the outer surface of the streamer 6 by a helical return spring 46 on axis 43. The brush 32 rotates on its axis 41 between two blades 48 linked by a spacer 47. The elements 47 and 48 used to support the brush 32, the friction roller 30 and the drive belt of the brush 32 from the roller 30, are designed to move in relation to one of the rails, and form a suspension arm for the roller 30 and the brush, allowing these elements 30 and 32 to be held against the outer surface of the streamer. The spring suspension can be enhanced by the addition of a damper 70 connecting the yoke 42 to the element 45 on the chassis. The brush 32 is moved by the runner 30 by means of a belt (not shown), with a speed of rotation which is greater than that of the runner.

Figure 10:
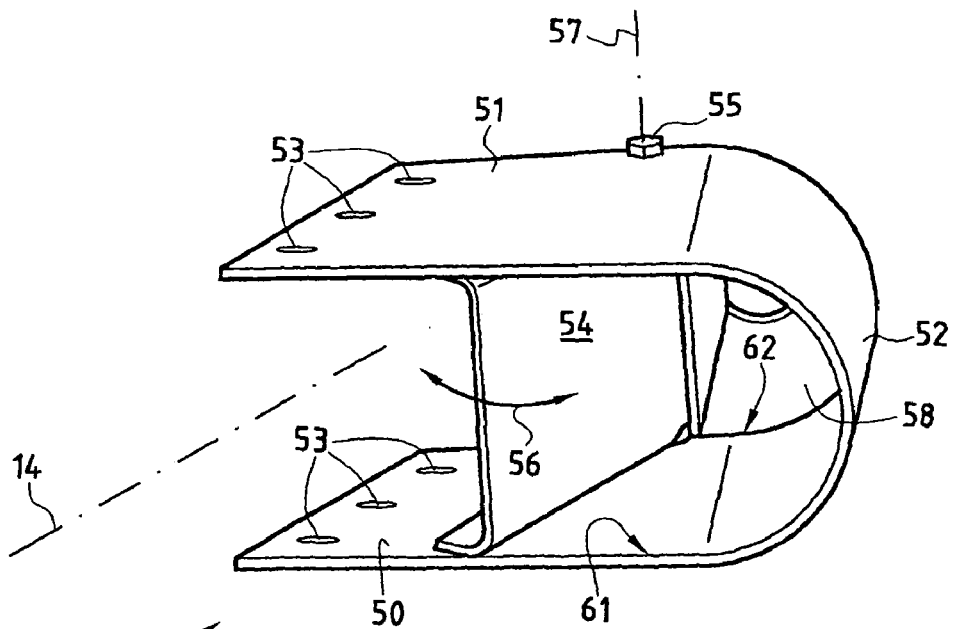
FIG. 10 illustrates, in perspective, one of two drag structures of the appliance of FIGS. 1 to 8.

With reference to FIG. 10, the structure (flared at the front) for the generation of drag 33 is essentially composed of a metal structure with two parallel blades 50 and 51, which are linked by an incurving element 52, with elements 50 to 52 capable of being created by the curvature of a metal plate. Each of the blades 50 and 51 is drilled out with orifices 53 allowing the attachment by bolts 34 of the structure 33 to the one of the rails 18 or 19 of the appliance.

The structure 33 also includes an approximately plane shutter 54 extending transversally in relation to the blades 50 and 51 and fixed to the latter by a bolt 55. The orientation of the shutter 54 in relation to the structure 50 to 52 can be modified by pivoting the shutter 54 in the direction of the arrow 56 along the axis 57 of the bolt 55. The structure 33 also includes an approximately conical part 58 forming an extension to parts 50 to 52, with the conical part 58 itself being extended, as illustrated in particular by FIG. 2, by a cylindrical part 59 which is open at its rear end 60.

The transverse section for the passage of water at the front 61 of the cleaning appliance is significantly greater than the intermediate section in the middle part 62 of the appliance 33, in particular because of the inclination of the shutter 54 in relation to axis 14 of the appliance. The section allowing the passage of water is reduced still further in the exit conduit 59 of the structure 33.

Where appropriate, the shutter 54 can be designed to rotate freely on axis 57, its inclination being limited by a return spring (not shown), with the movements of the shutter possibly being damped with a damping device (not shown).

In the mounted position of the structure 33 onto the appliance 11, the latter being forced through in the water in the direction of the arrow 9 (FIGS. 4 to 6) by the streamer at a speed which is less than that of the streamer because of its motion along the length of the latter, the water is taken in at the front section 61 of the structure 33, traverses the middle section 62, the conical portion 58 and the cylindrical rear portion 59, before escaping via the orifice 60. The force exerted by the water on the appliance 11 and on the structure 33 in particular, causes the cleaning appliance to move along the streamer, from its front (reference 7, FIG. 1) to its rear end (reference 8, FIG. 1), where the cleaning appliance 11 can remain pressed against an end-stop incorporated into the streamer until completion of a measurement run.

In order to facilitate the placement of the appliance around the front end of the streamer, before cleaning the latter, the chassis 15 is divided into two parts (left and right) which are assembled by the means of an attachment and locking device (reference 80, FIG. 5) after engagement of the guidance wheels and the cleaning tools against the opposite surfaces of the tubular body 6 of the streamer.

The invention claimed is:

1. A process for the cleaning of a towed seismic streamer, comprising the steps of:
    attaching around the seismic streamer, a cleaning appliance including a tool for cleaning the seismic streamer and a hydrodynamic drag structure,
    towing the seismic streamer, and
    creating a drag with said hydrodynamic drag structure as the streamer is moved along its longitudinal axis, using said drag to move the cleaning appliance along the seismic streamer.

2. A cleaning process according to claim 1, in which the speed of movement of the appliance along the seismic streamer is in a range of between 0.5 and 2.5 meters per second.

3. A cleaning process according to claim 1, comprising the steps of maintaining the cleaning appliance during its movement along the towed streamer in an approximately constant orientation in relation to the longitudinal axis of the streamer.

4. A cleaning process according to claim 3, wherein said cleaning appliance is provided with buoyancy means.

5. A cleaning process according to claim 1, comprising the step of positioning and guiding the cleaning appliance by means of at least one pair of members adapted to contact at low friction, respectively, approximately diametrically opposite portions of the outer tubular surface of the seismic streamer.

6. A cleaning process according to claim 5, wherein said members are rollers.

7. A cleaning process according to claim 6, comprising the step of cleaning the streamer by rotating at least two brushes positioned on either side of the streamer, said brushes being respectively driven by said rollers engaging the seismic streamer.

8. A cleaning process according to claim 5, comprising the step for forcing said members into contact with the outer surface of the streamer and moving them away from said contact so as to allow clearance of projections present along the streamer.

9. A process for the cleaning of a towed seismic streamer, comprising the steps of:
attaching around the seismic streamer a cleaning appliance including a tool for cleaning the seismic streamer and a hydrodynamic drag structure, and
towing the seismic streamer, whereby said hydrodynamic drag structure creates a drag as the streamer is moved along its longitudinal axis and using said drag to move the cleaning appliance along the seismic streamer, whilst maintaining the cleaning appliance during its movement along the towed streamer in an approximately constant orientation in relation to the longitudinal axis of the streamer.

10. A process for the cleaning of a towed seismic streamer equipped with appendages for controlling the depth of the streamer, comprising the steps of
attaching around the seismic streamer a cleaning appliance including a tool for cleaning the seismic streamer and a hydrodynamic drag structure, and
towing the seismic streamer, whereby said hydrodynamic drag structure creates a drag as the streamer is moved along its longitudinal axis and using said drag to move the cleaning appliance along the seismic streamer, whilst maintaining the cleaning appliance during its movement along the towed streamer in an approximately constant orientation in relation to the longitudinal axis of the streamer, astride said appendages.

* * * * *